United States Patent [19]

Shimazawa

[11] Patent Number: 6,123,781
[45] Date of Patent: Sep. 26, 2000

[54] METHOD OF CONTROLLING MAGNETIC CHARACTERISTICS OF SPIN-VALVE MAGNETORESISTIVE ELEMENT AND OF MAGNETIC HEAD WITH THE ELEMENT

[75] Inventor: Kouji Shimazawa, Nagano, Japan

[73] Assignee: TDK Corporation, Tokyo, Japan

[21] Appl. No.: 09/027,773

[22] Filed: Feb. 23, 1998

[30] Foreign Application Priority Data

Feb. 28, 1997 [JP] Japan .................................. 9-060180

[51] Int. Cl.⁷ .................................................. H01F 10/32
[52] U.S. Cl. ........................... 148/108; 148/121; 148/103
[58] Field of Search ..................... 148/103, 108, 148/120, 121

[56] References Cited

U.S. PATENT DOCUMENTS 5,206,590   4/1993   Dieny et al. .
5,422,571   6/1995   Gurney et al. .
5,650,887   7/1997   Dovek et al. .

*Primary Examiner*—John Sheehan
*Attorney, Agent, or Firm*—Arent Fox Kintner; Plotkin & Kahn

[57] ABSTRACT

A method of controlling magnetic characteristics of a spin valve effect MR element and a method of controlling magnetic characteristics of a magnetic head with the MR element include a step of supplying direct current with a gradually increasing value to the MR element so as to generate magnetic field in a desired direction and to generate joule heat, the generated magnetic field and the generated joule heat being applied to the MR element, and a step of controlling a magnetization direction caused by exchange coupling in the MR element based upon the applied magnetic field and the applied joule heat.

26 Claims, 11 Drawing Sheets

METHOD OF CONTROLLING MAGNETIC CHARACTERISTICS OF SPIN-VALVE MAGNETORESISTIVE ELEMENT AND OF MAGNETIC HEAD WITH THE ELEMENT

FIELD OF THE INVENTION

The present invention relates to a method of controlling magnetic characteristics of a spin valve effect magnetoresistive (MR) element and a method of controlling magnetic characteristics of a magnetic head with the MR element.

DESCRIPTION OF THE RELATED ART

Due to the recent demand for higher density in a hard disk device (HDD), it has been required to develop a high sensitive and high power output magnetic head. To serve the requirements, a magnetic head with a spin valve effect element which is one of elements providing the giant MR effect is provided (U.S. Pat. Nos. 5,206,590 and 5,422,571). This spin valve effect element has a sandwiched structure with two ferromagnetic material thin-film layers magnetically separated by a non-magnetic material thin-film layer. An antiferromagnetic material thin-film layer is deposited on and in contact with one of the two uncoupled ferromagnetic layers so as to produce an exchange biasing magnetic field at their boundary and to apply the biasing magnetic field to this ferromagnetic layer. Therefore, this one ferromagnetic layer (pinned layer) receives the biasing magnetic field, whereas the other ferromagnetic layer (free layer) receives no biasing magnetic field so that magnetization switching (inversion) is introduced by different magnetic fields between the two ferromagnetic layers. The magnetization directions of the two ferromagnetic layers (pinned and free layers) therefore change between the parallel and in antiparallel with each other so that the electrical resistivity of this spin valve effect element greatly varies to obtain the giant MR effects.

Output characteristics of this spin valve effect MR element are determined depending upon an angle between magnetization directions in the two ferromagnetic layers (pinned and free layers). The magnetization direction in the free layer is easily changed in response to the direction of magnetic field from a magnetic record medium, whereas the magnetization direction in the pinned layer is fixed to one direction (pinned direction) by means of the exchange coupling with the antiferromagnetic layer.

In order to produce the exchange coupling between the antiferromagnetic layer and the ferromagnetic layer (pinned layer), there is conventionally provided an annealing process in magnetic field in which heating is executed while applying the external magnetic field thereto during a manufacturing process of magnetic heads. That is, in this annealing process in magnetic field, the external magnetic is applied to the spin valve effect MR element in a direction which produce the exchange coupling between the antiferromagnetic layer and the ferromagnetic layer in a state where the spin valve effect MR element is heated to a temperature (Neel temperature) at which the magnetic order disappears, and thereafter, cooling treatment is executed.

Thus, in order to produce the exchange coupling between the antiferromagnetic layer and the ferromagnetic layer, it is necessary in the prior art to additionally provide an annealing process in magnetic field, whereby not only the manufacturing processes become complicated but also the manufacturing cost is increased.

Also, to simultaneously carry out the same magnetization process for a plurality of magnetic heads, it is necessary to uniformly align the directions of the external magnetic fields which are applied to the magnetic heads. Therefore, the annealing process in magnetic field is usually executed at a wafer process stage of the magnetic heads or at a bar stage where a wafer is cut into some bar-shaped blocks. This is because carrying out such annealing process in magnetic field after separating the bar block into the individual magnetic heads is troublesome to define the magnetization directions and becomes noneffective. However, even if the magnetic heads are in any state such as in a state where they are individually separated, it is naturally desirable that the process of producing the exchange coupling between the antiferromagnetic layer and the ferromagnetic layer can be easily executed.

When some electric charges are applied to the terminals of the MR elements due to certain reason during manufacturing processes such as the wafer process of the magnetic heads and the mechanical working process, or during assembling processes of completed heads to the HDD, the pinned direction of the spin valve effect MR element may be changed or inverted and thus various characteristics of the head may vary causing incorrect reproduction of the magnetically recorded signal. The change or inversion of the pinned direction may be caused by heat and magnetic field generated by the applied electric charges.

As aforementioned, if the pinned direction changes, the angle between the magnetization directions in the pinned and free layers also changes causing the output characteristics to vary. Thus, it is very important in the magnetic head with the spin valve effect MR element to correctly maintain (fix) the pinned direction. However, when the pinned direction changes after separating the bar block into the individual magnetic heads, it is very noneffective as mentioned above to produce the exchange coupling between the antiferromagnetic layer and the ferromagnetic layer again and return the pinned direction to the correct direction. Therefore, such processes have not been executed in the conventional technique, and the resulting magnetic heads have been treated as failed components.

SUMMARY OF THE INVENTION

It is therefore an object of the present invention to provide a method of controlling magnetic characteristics of a spin valve effect MR element and a method of controlling magnetic characteristics of a magnetic head with the MR element, whereby control of the pinned direction in the spin valve effect MR element can be extremely easily executed without adding new processes.

It is another object of the present invention to provide a method of controlling magnetic characteristics of a magnetic head with the MR element, whereby control of the pinned direction in the spin valve effect MR element can be extremely easily executed even after the magnetic heads are individually separated.

According to the present invention, a method of controlling magnetic characteristics of a spin valve effect MR element and a method of controlling magnetic characteristics of a magnetic head with the MR element include a step of supplying direct current with a gradually increasing value to the MR element so as to generate magnetic field in a desired direction and to generate joule heat, the generated magnetic field and the generated joule heat being applied to the MR element, and a step of controlling a magnetization direction caused by exchange coupling in the MR element based upon the applied magnetic field and the applied joule heat.

Also, according to the present invention, the MR element has a non-magnetic metallic material thin-film layer, first and second ferromagnetic material thin-film layers magnetically separated with each other by the non-magnetic metallic material thin film layer and an antiferromagnetic material thin-film layer deposited on the second ferromagnetic layer, and the method includes a step of supplying direct current with a gradually increasing value to the MR element so as to generate magnetic field in a desired direction and to generate joule heat, a step of applying the generated joule heat to heat the antiferromagnetic layer to increase its temperature equal to or more than the Neel temperature, a step of applying the generated magnetic field to the second ferromagnetic layer to magnetize it toward a predetermined direction, and a step of applying a magnetic field to the antiferromagnetic layer.

In the method of controlling magnetic characteristics of the present invention, the heating process and magnetization process for the exchange coupling with a spin valve effect MR element are simultaneously executed by only supplying direct current to the MR element so that the value of the current is gradually increased. Since the method of the present invention can be accomplished by only one supply or direct current to the MR element by the same manner as in the sense current, it can be extremely easily executed without adding new steps. Also, even after magnetic heads are individually separated, the control of the pinned direction in the MR element can be extremely easily and reliably executed. Consequently, the magnetic head individually separated and treated as a defective head due to change in the pinned direction can be recovered as a good article by adjusting the pinned direction to the correct direction. This control of the pinned direction can be executed even in operation of a magnetic disk device after assembling magnetic heads in the magnetic disk device, so that the pinned direction is always maintained in the normal state.

When supplying direct current to the spin valve effect MR element, fracture of the spin valve effect MR element which may occur if the direct current is rapidly increased can be previously prevented by controlling the value of the direct current so that it is gradually increased in a continuous or stepwise manner.

It is preferred that the method further includes a step of supplying the direct current with a value to the MR element after the supplying step, the value being gradually decreased to a predetermined value and being maintained at the predetermined value for a predetermined period of time so as to cool the MR element. Since MR element can be cooled under application of the magnetic field which is greater than the obstacle bias magnetic field generated by hard magnets, by gradually decreasing the direct current, the pinned direction can be more reliably controlled.

It is also preferred that the method further includes a step of supplying the direct current with a value to the MR element after the supplying step, the value being gradually decreased to zero so as to cool the MR element.

It is preferred that the MR element has sense current terminals, and that the direct current is supplied from the sense current terminals to the MR element.

Preferably, a time period for supplying the direct current with a gradually increasing value to the MR element is a predetermined fixed period of time.

Also, preferably, the value of the direct current supplied is determined depending upon a resistance value of the MR element.

It is preferred that the method further includes a step of measuring the resistance value ($R_{REF}$) of the MR element when a reference current value ($I_{REF}$) is supplied to the MR element, and a step of determining the value of the direct current supplied depending upon the measured resistance value ($R_{REF}$).

The determining step may include a step of determining the direct current in accordance with a temperature ($T_{REF}$) of the MR element when a reference current value ($I_{REF}$) is supplied thereto, a temperature (T) up to which the MR element is to be heated, and the measured resistance value ($R_{REF}$).

Preferably, the determining step may include a step of calculating the value of the direct current ($I_{CA}$) from an experimental equation of $\Delta T=1.9469\times10^{-4}\times(I_{CA}\times R_{REF})^2 + 1.0845$, where $\Delta T$ is the difference between the temperature $T_{REF}$ and the temperature T.

It is preferred that the magnetic characteristics control is executed at least one time during manufacturing processes of the magnetic head and/or during evaluation processes of electro-magnetic conversion characteristics of the magnetic head.

It is also preferred that the magnetic head is to be mounted in a magnetic disk device, and that the magnetic characteristics control is executed at least one time during assembling processes of the magnetic disk device after manufacturing processes of the magnetic head and/or during evaluation processes of electro-magnetic conversion characteristics of the magnetic disk device.

It is preferred that the magnetic characteristics control is executed at least one time during a self-diagnosis carried out at power-on of the magnetic disk device.

Further objects and advantages of the present invention will be apparent from description of the preferred embodiments of the invention as illustrated in accompanying drawings.

BRIEF DESCRIPTION OF THE DRAWINGS

FIG. 8, constituted by combining FIGS. 8A to 8C, shows a flow chart illustrating when the pinned direction control according to the present invention is actually executed.

DESCRIPTION OF THE PREFERRED EMBODIMENTS

Before describing the embodiments of the present invention, basic principle of the present invention will be explained.

Figure 1:
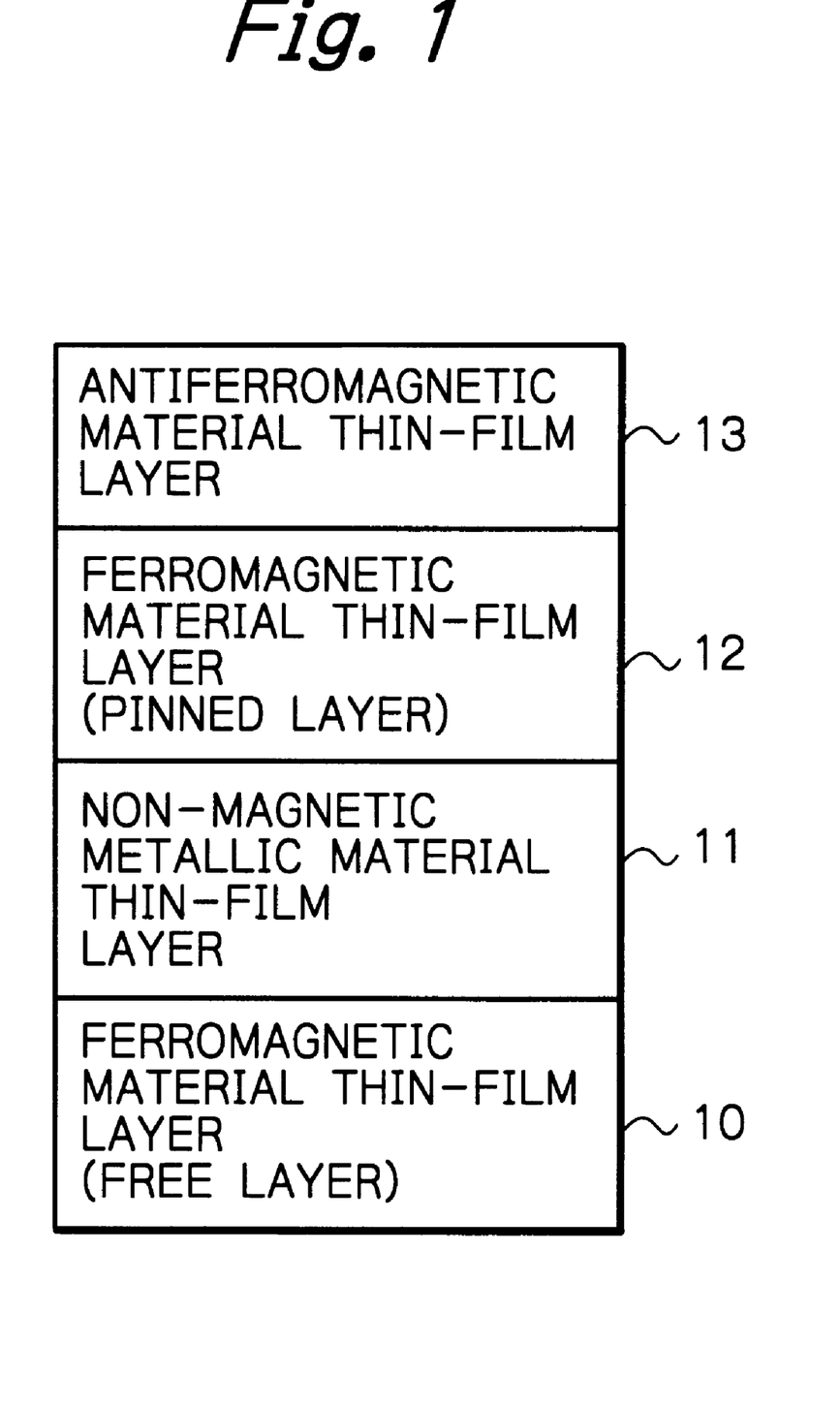
FIG. 1 shows a cross-sectional view illustrating a basic configuration of a multi-layered spin valve structure.

In FIG. 1 illustrating a multi-layered spin valve structure of the present invention, reference numerals 10 and 12 are two ferromagnetic material thin-film layers. The multi-layered spin valve structure has a sandwiched structure with the two layers 10 and 12 magnetically separated with each other by a non-magnetic metallic material thin-film layer 11. On the layer 12 is deposited an antiferromagnetic material thin-film layer 13. Exchange bias magnetic field generated at the interface between the ferromagnetic layer 12 and the antiferromagnetic layer 13 is applied to the ferromagnetic layer (a pinned layer) 12 to pin layer 12. The layer 10 is a free layer to which no exchange biasing magnetic field is applied.

Figure 2A:
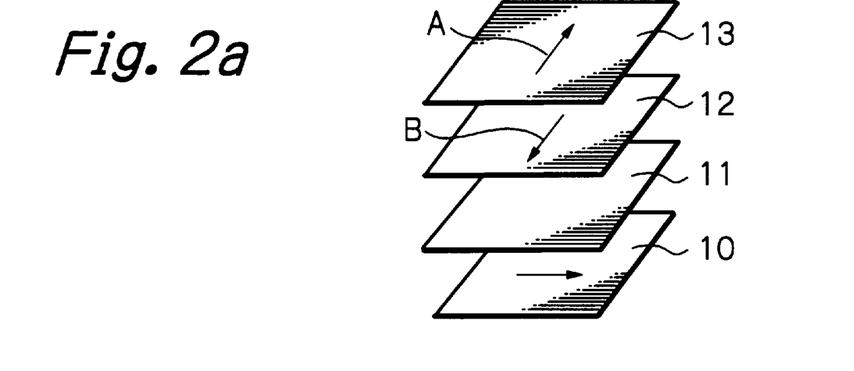
FIGS. 2a to 2d illustrates the control principle of the pinned direction of the multi-layered spin valve structure.
Figure 2B:
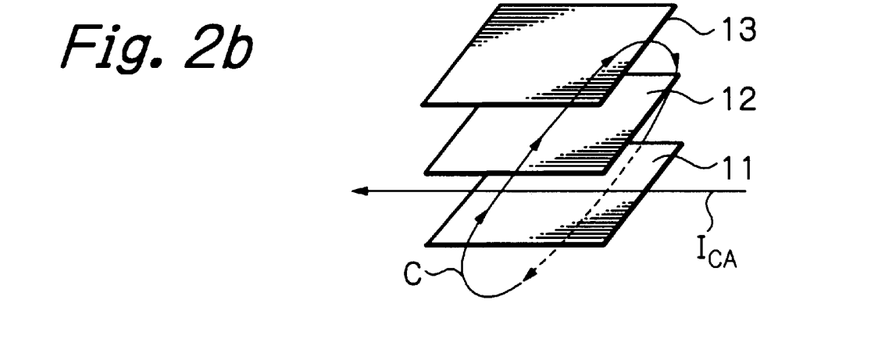
Figure 2C:
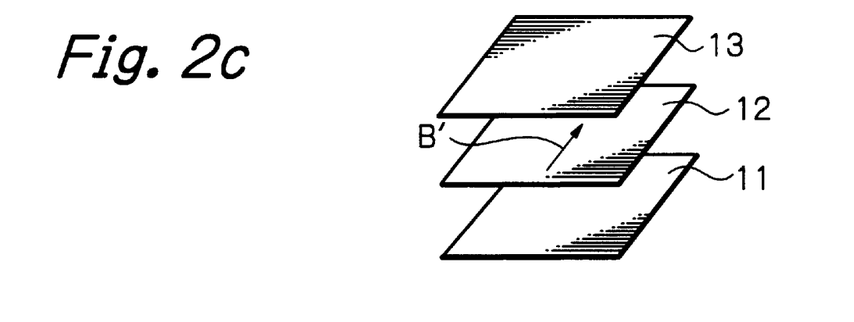
Figure 2D:
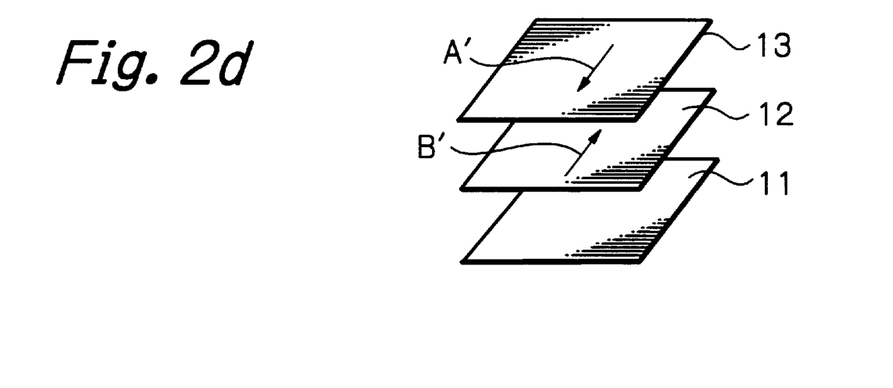

FIGS. 2a to 2d illustrate the control principle of the pinned direction of the multi-layered spin valve structure. As shown in FIG. 2a, it is supposed that the antiferromagnetic layer 13 has an erroneous anisotropic direction, shown by an arrow A, due to a certain reason. Thus, a pinned direction of the ferromagnetic layer 12 has an erroneous pinned direction shown by an arrow B. According to the present invention, direct current having a value of $I_{CA}$ is supplied to flow through the spin valve structure in a direction shown in FIG. 2b to generate heat in the spin valve structure due to joule effect caused by the supplied current. When temperature of the antiferromagnetic layer 13 increases above Neel temperature, its magnetic order disappears. Thus, a non-pinned ferromagnetic layer 12 is easily magnetized by magnetic field C generated by the direct current in a direction B' shown in FIG. 2c. This magnetization direction of the ferromagnetic layer 12 can be freely controlled by adjusting the direction of direct current flow. When the temperature of the antiferromagnetic layer 13 decreases lower than the Neel temperature by decreasing the value $I_{CA}$ of direct current or stopping the application itself, anisotropy is generated in the direction A' depending upon the magnetization direction (an arrow B') of the ferromagnetic layer 12 or upon the direction of applied magnetic field due to decreased direct current $I_{CA}$, in this antiferromagnetic layer 13, as shown in FIG. 2d. When the magnetic order in the antiferromagnetic layer 13 is recovered, the ferromagnetic layer 12 is pinned in the direction B'.

Figure 3:
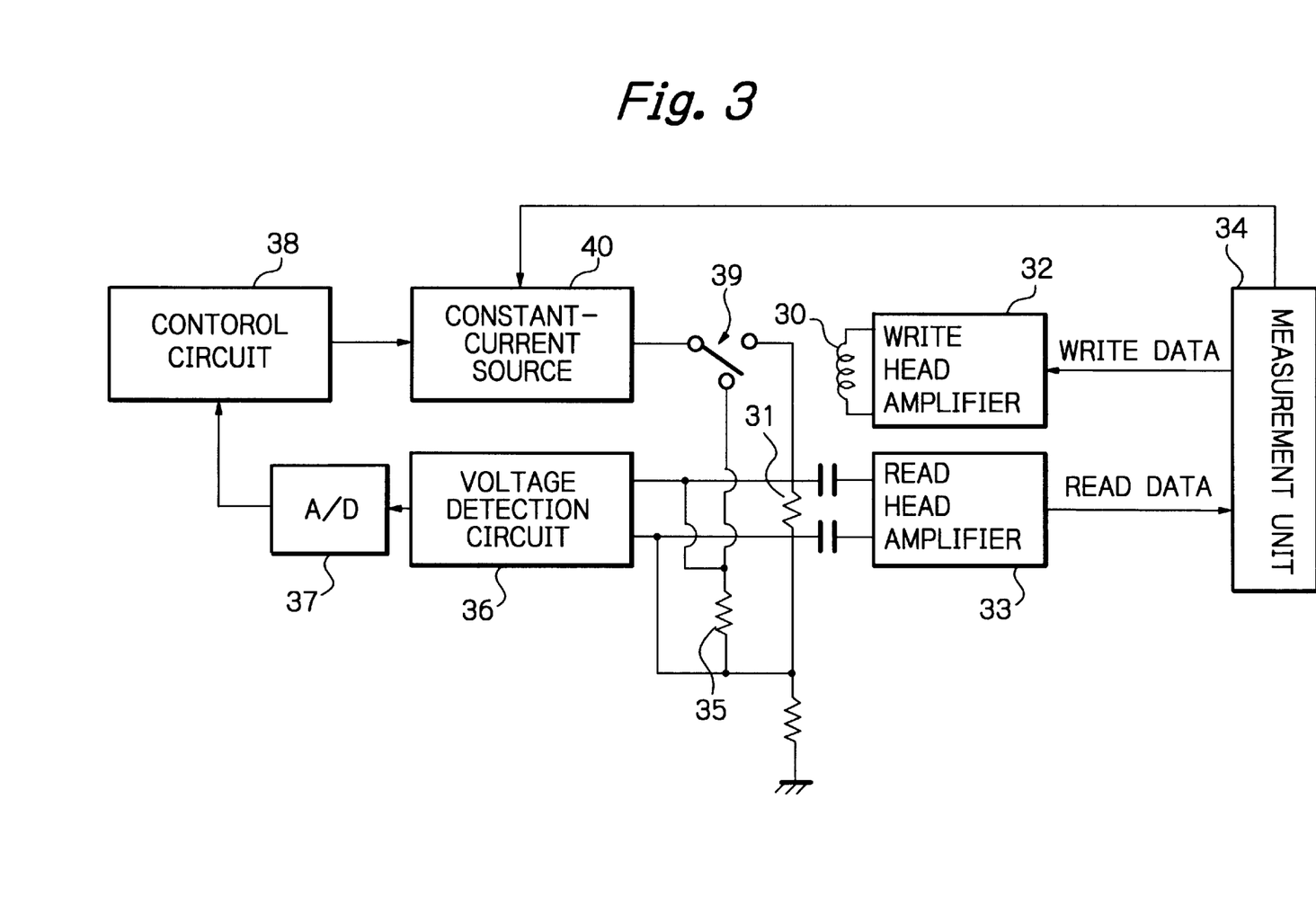
FIG. 3 shows a block diagram schematically illustrating a preferred embodiment according to the present invention.

FIG. 3 schematically illustrates a preferred embodiment of a method of controlling magnetic characteristics of a magnetic head according to the present invention. In this embodiment, the magnetic characteristics is controlled during an evaluation process of electro-magnetic conversion characteristics of a composite type magnetic head. The evaluation process will be executed after output electrode terminals connected to a spin valve effect MR element are formed in a wafer process and before a magnetic head assembly with the MR element mounted in HDD is actually operated.

The pinned direction of the spin valve effect MR element has possibility to change a little due to damage subjected during manufacturing processes of magnetic heads or of subsequent HDD. Because of too small change, it is difficult to detect it by the following evaluation process of electro-magnetic conversion characteristics or the evaluation process of ρ–H characteristics with respect to the magnetic head. This causes to the MR element to have deteriorated characteristics compared to those in the inherent state.

Whereas, in this embodiment, a process of supplying direct current to the element from an evaluation device connected with terminal electrodes of each of the magnetic heads to produce magnetic field in the same direction as the inherent pinned direction is executed during the evaluation process of the electro-magnetic conversion characteristics, so that the pinned direction is recovered to the inherent direction by heat and magnetic field generated by the supplied current.

In FIG. 3, reference numeral 30 denotes a writing inductive element and 31 denotes a reading spin valve effect MR element in the composite type magnetic head, respectively. To the terminal electrodes of the inductive element 30 is connected a write head amplifier 32, and to the terminal electrodes of the MR element 31 is connected to a read head amplifier 33 via capacitors. These head amplifiers 32 and 33 are connected to a measurement unit 34 for measuring the electro-magnetic conversion characteristics. The above-mentioned configuration is well-known for an evaluation device of electro-magnetic conversion characteristics.

According to the present invention, as shown in FIG. 3, a dummy resistor 35 for measuring temperature of the MR element 31 is mounted near the magnetic head or in contact with the magnetic head. Across the MR element 31 and across the dummy resistor 35 is connected a voltage detection circuit 36. To the voltage detection circuit 36 is connected a control circuit 38, substantially constituted by a microcomputers, via an A/D converter 37. The MR element 31 and the dummy resistor 35 are connected to a constant-current source 40 via a switch 39. To this constant-current source 40 is connected a control circuit 38.

The switch 39 selectively supplies either the MR element 31 or the dummy resistor 35 with direct current supplied from the constant-current source 40. The direct current has a value instructed by the control circuit 38. The voltage direction circuit 36 detects values of the voltages across the MR element 31 and the dummy resistor 35, and outputs the detected values to the control circuit 38 via the A/D converter 37. Thus, the control circuit 38 can calculate a resistance value of the dummy resistor 35, which corresponds to the temperature of the magnetic head at that time, and a resistance value of the MR element 31 from the input voltage values and the calculated value of the direct current. Then, the control circuit 38 calculates again the value of direct current to be supplied for controlling pinned direction, from these obtained temperature and resistance values. The calculated current value is supplied to the constant-current source 40 as the instructed value. Thus, the constant-current source 40 supplies the MR element 31 with the direct current having the instructed value $I_{CA}$ of direct current for a period of time which is also instructed by the control circuit 38.

In this embodiment, before controlling magnetic characteristics (pinned direction), a relationship equation between the temperature ΔT to be increased in the MR element 31, the value R of resistance of the MR element 31 and the value $I_{CA}$ of the direct current to be supplied is experimentally formed as follows.

Figure 4:
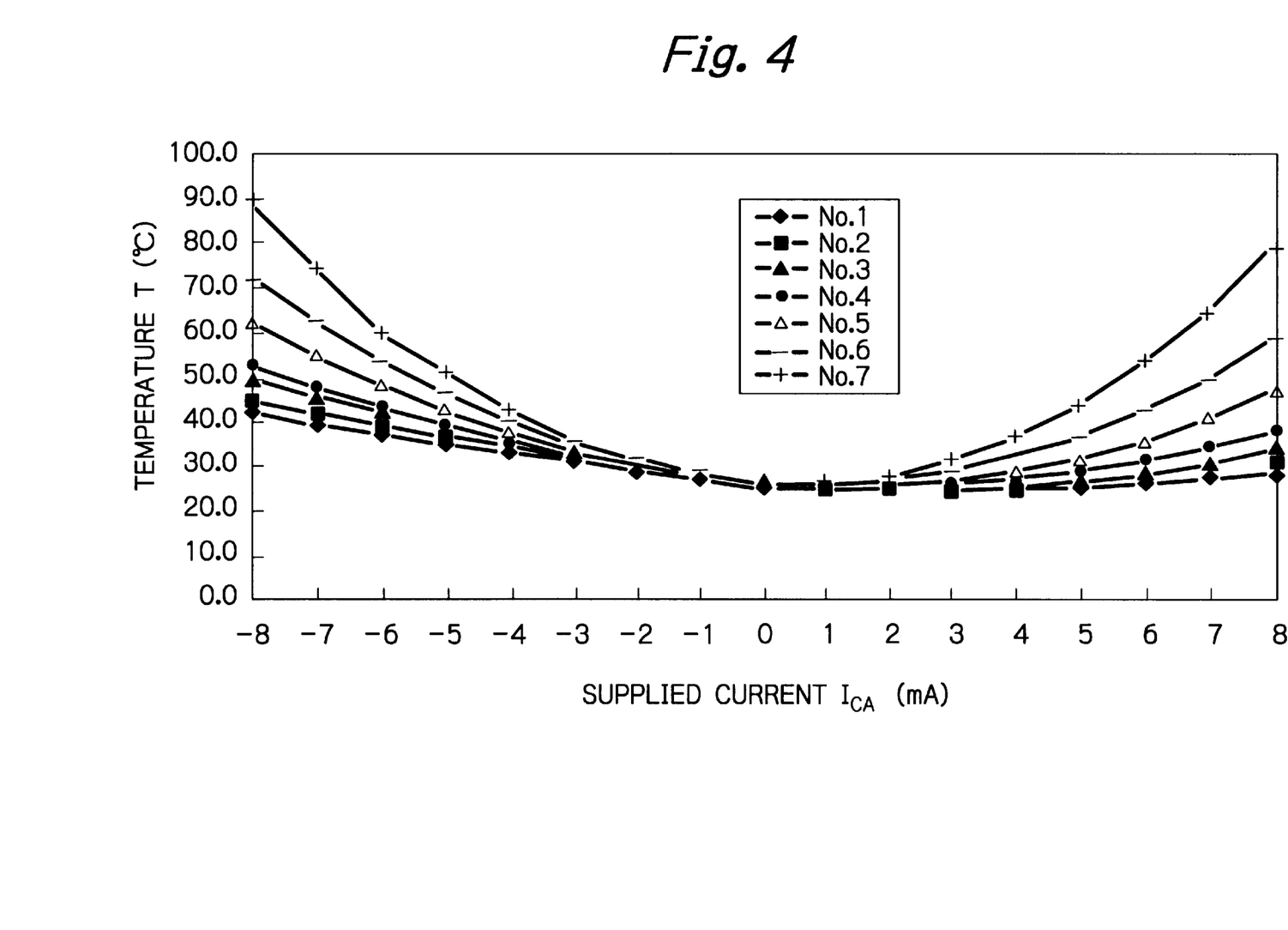
FIG. 4 illustrates experimental results of relationships between the current ($I_{CA}$) and the increase in temperature ($\Delta T$)

It has been found from many experiments, that there is a relationship of $R/R_{REF}=0.0013876T+0.96303$ between the resistance value R (Ω) of the spin valve effect MR element heated to a temperature T (°C.) and this temperature T, where $R_{REF}$ (Ω) is a value of resistance of the MR element when a reference current $I_{REF}$ (=1 mA) is supplied to the MR element. The temperature T has the following expression, i.e., $T=(R/R_{REF}-0.96303)/0.0013876$. The relationship between the supplied current $I_{CA}$ and an increase in temperature $\Delta T$ (=$T-T_{REF}$) are obtained by experiments for samples, having various inherent resistances (reference resistances), of the spin valve effect MR element, where $T_{REF}$ is an environment temperature or reference temperature of the MR element when the reference current $I_{REF}$ (=1 mA) is supplied. A part of the results are shown in Table 1 and in FIG. 4. FIG. 4 illustrates relationship between supplied current $I_{CA}$ and temperature T in a condition where the reference temperature $T_{REF}$ is 25° C.

35. Namely, this measurement is executed by switching the switch 39 to the dummy resistor 35 side, by supplying the dummy resistor 35 with the reference current $I_{REF}$ of 1 mA from the constant-current source 40, and by detecting the terminal voltage across the dummy resistor 35 by means of the voltage detecting circuit 36.

Figure 5:
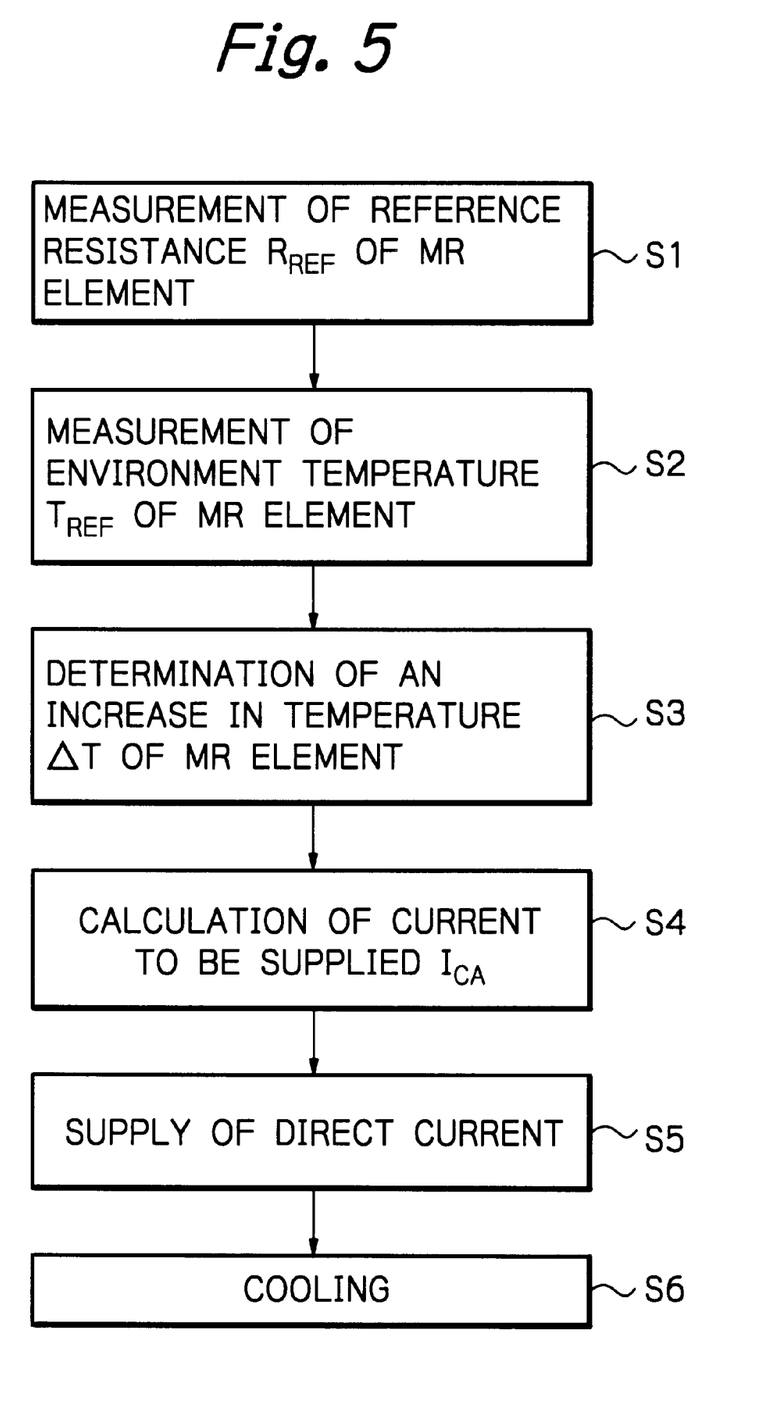
FIG. 5 shows a flow chart illustrating an example of a control procedure of magnetic characteristics in the embodiment of FIG. 3.

Then, at step S3, an increase in temperature $\Delta T$ of the MR element 31 is determined. The increase in temperature $\Delta T$ is the difference between the temperature T to which the MR element 31 should be heated and the reference temperature $T_{REF}$. Therefore, if the temperature to which the MR element 31 is determined to control the pinned direction, the increase in temperature $\Delta T$ can be easily obtained by the measured reference temperature $T_{REF}$.

Figure 6:
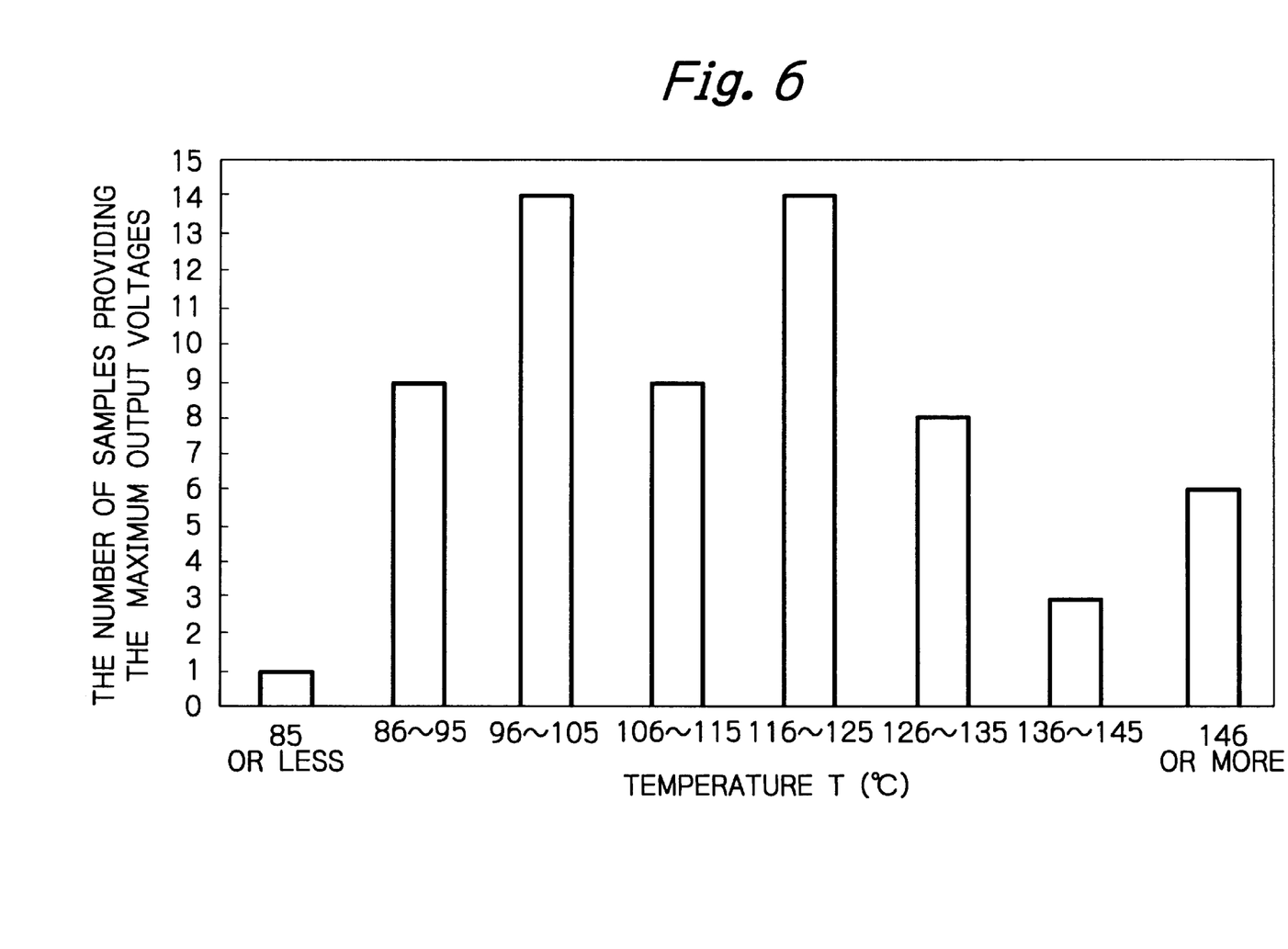
FIG. 6 illustrates relationships between temperature of spin valve effect MR element samples and the number of the samples providing the maximum output voltages when heated to the temperatures.

FIG. 6 illustrates results of measurement with respect to the output voltage characteristics of samples of the spin valve effect MR element with various inherent resistances after actually supplying direct current to the MR element to increase the temperature thereof and controlling the pinned direction. In the figure, the horizontal axis represents temperature T of the MR element samples and the vertical axis represents the number of the element samples providing the maximum output voltages when heated to the temperature. As will be apparent from FIG. 6, it is preferred that the temperature T is in a range of 85° C. to 135° C.

Then, at step S4, the value of direct current $I_{CA}$ to be supplied is calculated from the determined $\Delta T$ and the $R_{REF}$ obtained by using the above-mentioned equation, i.e., $\Delta T = 1.9469 \times 10^{-4} \times (I_{CA} \times R_{REF})^2 + 1.0845$.

At next step S5, direct current with the calculated value $I_{CA}$ is supplied to the MR element 31. That is, after the switch 39 is switched to the MR element 31 side, the direct current with the value $I_{CA}$ is supplied from the constant-current source 40 to the MR element 31. In this case, the current is increasingly supplied so that it is continuously or step wise increased. It is desirable that the time period for supplying this current is a predetermined time period of about one sec.

Figure 7:
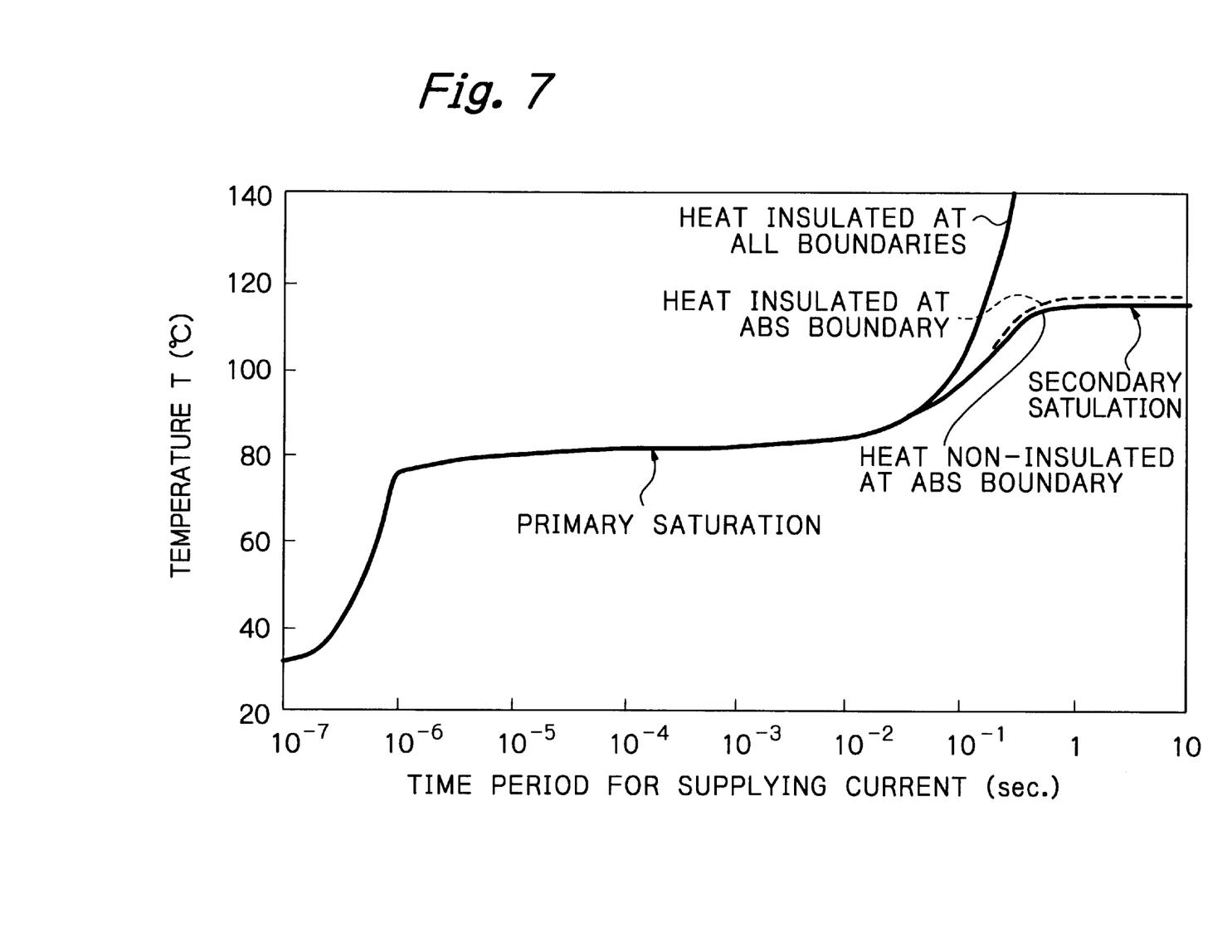
FIG. 7 illustrates simulated relationships between time for supplying current to the spin valve effect MR element and temperature of the element.

FIG. 7 illustrates simulated relationships between time period for supplying current to the MR element and temperature of the element. In the simulations, calculations are executed with the supplied current of 6 mA, the MR element resistance of 50 Ω and the reference temperature of 25° C. The primary saturation of the temperature of the MR element shown in the figure is heat saturation of the MR

TABLE 1

| Is[mA] | SAMPLE No. 1 $R_{REF} = 25.5[\Omega]$ $\Delta T$ [°C.] | SAMPLE No. 2 $R_{REF} = 30.2[\Omega]$ $\Delta T$ [°C.] | SAMPLE No. 3 $R_{REF} = 35.3[\Omega]$ $\Delta T$ [°C.] | SAMPLE No. 4 $R_{REF} = 39.8[\Omega]$ $\Delta T$ [°C.] | SAMPLE No. 5 $R_{REF} = 48.6[\Omega]$ $\Delta T$ [°C.] | SAMPLE No. 6 $R_{REF} = 55.1[\Omega]$ $\Delta T$ [°C.] | SAMPLE No. 7 $R_{REF} = 67.8[\Omega]$ $\Delta T$ [°C.] |
|---|---|---|---|---|---|---|---|
| −8 | 17.2 | 19.9 | 25.2 | 28.2 | 37.6 | 46.8 | 65.3 |
| −7 | 15.0 | 16.8 | 21.1 | 22.8 | 30.2 | 38.0 | 49.5 |
| −6 | 12.0 | 14.0 | 17.7 | 18.3 | 23.4 | 28.9 | 35.6 |
| −5 | 9.6 | 11.4 | 14.5 | 14.2 | 17.5 | 21.4 | 26.3 |
| −4 | 8.0 | 8.8 | 11.9 | 10.3 | 12.4 | 15.1 | 17.6 |
| −3 | 5.4 | 6.8 | 8.8 | 7.4 | 7.8 | 9.7 | 10.7 |
| −2 | 3.1 | 5.2 | 6.8 | 4.4 | 4.6 | 5.6 | 5.4 |
| −1 | 1.6 | 2.8 | 2.7 | 2.5 | 2.4 | 2.3 | 2.2 |
| 0 | 0.0 | 0.0 | 0.0 | 0.0 | 0.0 | 0.0 | 0.0 |
| 1 | 1.6 | 0.4 | 0.6 | 0.7 | 0.2 | 1.0 | 1.1 |
| 2 | 0.2 | 0.4 | −0.4 | 0.7 | 0.2 | 1.6 | 2.7 |
| 3 | −0.2 | −0.3 | −0.7 | 0.7 | 1.4 | 3.6 | 6.1 |
| 4 | −0.5 | −0.1 | −0.4 | 1.6 | 3.5 | 6.9 | 11.5 |
| 5 | −0.1 | 0.9 | 0.6 | 3.6 | 6.5 | 11.5 | 18.8 |
| 6 | 0.7 | 2.0 | 2.7 | 6.2 | 10.5 | 17.4 | 28.5 |
| 7 | 1.6 | 3.5 | 5.3 | 9.0 | 15.7 | 24.6 | 38.9 |
| 8 | 3.1 | 5.5 | 8.8 | 12.7 | 22.2 | 33.7 | 53.3 |

The above-mentioned $\Delta T$ can be expressed by functions of $I_{CA}$ and $R_{REF}$ as shown in Table 2. As will be apparent from this Table 2, similar relationship equations can be obtained in spite of different inherent resistances of the MR element.

TABLE 2

| SAMPLE | $R_{REF}$ [Ω] | $\Delta T$ [°C.] |
|---|---|---|
| No. 1 | 25.5 | $\Delta T = 2.2128 \times 10^{-4} \times (I_{CA} \cdot R_{REF})^2 + 1.1273$ |
| No. 2 | 30.2 | $\Delta T = 1.9481 \times 10^{-4} \times (I_{CA} \cdot R_{REF})^2 + 1.4786$ |
| No. 3 | 35.3 | $\Delta T = 1.9111 \times 10^{-4} \times (I_{CA} \cdot R_{REF})^2 + 1.5279$ |
| No. 4 | 39.8 | $\Delta T = 1.8851 \times 10^{-4} \times (I_{CA} \cdot R_{REF})^2 + 1.1481$ |
| No. 5 | 48.6 | $\Delta T = 1.8858 \times 10^{-4} \times (I_{CA} \cdot R_{REF})^2 + 0.5898$ |
| No. 6 | 55.1 | $\Delta T = 1.9399 \times 10^{-4} \times (I_{CA} \cdot R_{REF})^2 + 1.1360$ |
| No. 7 | 67.8 | $\Delta T = 1.8454 \times 10^{-4} \times (I_{CA} \cdot R_{REF})^2 + 0.5839$ |

By averaging the above-mentioned equations, the following relationship equation representing a relationship among the increase in temperature of the MR element $\Delta T$, the resistance value $R_{REF}$ and current supplied to the MR element $I_{CA}$ can be obtained:

$$\Delta T = 1.9469 \times 10^{-4} \times (I_{CA} \times R_{REF})^2 + 1.0845.$$

By utilizing this relationship equation, the control circuit 38 obtains a value $I_{CA}$ of the direct current to be supplied to the MR element 31 for controlling the pinned direction, as follows.

FIG. 5 illustrates an example of a control procedure of the pinned direction in the embodiment. First, at step S1, the reference resistance $R_{REF}$ of the MR element 31 is measured. This measurement is executed by switching the switch 39 to the MR element 31 side, by supplying the MR element 31 with the reference current $I_{REF}$ of 1 mA from the constant-current source 40 and by detecting the terminal voltage across the MR element 31 by mean of the voltage detection circuit 36.

Next, at step S2, the reference temperature $T_{REF}$ of the MR element 31, which corresponds to the temperature of the MR element 31 immediately after the reference current $I_{REF}$ is supplied thereto, is measured. This temperature is obtained by measuring the resistance of the dummy resistor element itself. This saturation represents a step of heat dissipation to a gap layer and a shield layer which are provided outside the MR element of the magnetic head. The secondary saturation of the temperature of the MR element shown in the figure has different characteristics depending on the fact that all boundaries of the MR element are heat insulated, that a boundary at the ABS (Air Bearing Surface) of the MR element is heat insulated, or that air exists without heat insulation at the boundary of the ABS of the MR element. In a case that the boundary at the ABS of the MR element is not heat insulated as in an actual magnetic head, the temperature of the MR element is saturated for one sec. after supply of the current. Thus, the period of time for supplying the current for about one sec. will result sufficient heating effect for controlling the pinned direction.

When the current with the value $I_{CA}$ is supplied for the above-mentioned time period, the MR element is heated by the joule heat due to the current. Thus, temperature of the antiferromagnetic material thin-film layer 13 is increased to above the Neel temperature. Thus, the magnetic order of the antiferromagnetic layer 13 disappears and the non-pinned ferromagnetic layer 12 can be easily magnetized by magnetic field produced by the direct current.

Next, at step S6 the value of the supplied direct current is gradually decreased to a predetermined value, and thus obtained predetermined value is maintained for a desired time, thereby cooling the MR element 31. Alternatively, the value of direct current supplied is gradually decreased to zero and the value of zero is maintained for a desired time thereby cooling the MR element 31. Thus, when the temperature of the antiferromagnetic layer 13 is decreased to below the Neel temperature, anisotropy is produced in this layer 13 in a direction depending on the magnetization direction of the ferromagnetic layer 12 or on the direction of the magnetic field generated by the supplied direct current. Thus, the magnetic order is recovered in the antiferromagnetic layer 13, and therefore the ferromagnetic layer 12 is pinned in the anisotropic direction.

In the embodiment described above, the reference or environment temperature of the MR element 31 is measured by means of the dummy resistor 35. However, there are various methods other than that for measuring the reference or environment temperature and it is apparent that any one of these methods can be used for measuring the reference temperature. If the reference or environment temperature of the spin valve effect MR element is known kept at the known temperature (in manufacturing process, the environment temperature is often maintained at constant), measurement of the reference or environment temperature is not needed. In this case, the dummy resistor 35 and the switch 39 are omitted from the circuit block diagram of FIG. 3, and the step S2 is omitted from the flow chart of FIG. 5.

In the embodiment described above, the control of the pinned direction is executed during the evaluation process of electro-magnetic conversion characteristics in the composite type magnetic head with both the writing inductive element and the reading spin valve effect MR element. However, it is apparent to a person skilled in the art that the pinned direction control may be executed during an evaluation process of ρ–H characteristics of a magnetic head with only a spin valve effect MR element or during an evaluation process of ρ–H characteristics of a spin valve effect MR sensor. In these cases, a Helmholtz coil is provided in place of the writing inductive element 30 in FIG. 3 and a power source for Helmholtz coil is provided in place of the writing head amplifier 30 in FIG. 3. Also, the writing data are replaced by signals for generating alternating current magnetic field of the Helmholtz coil.

As described above, the control of the pinned direction according to this embodiment is executed during the evaluation process of the electro-magnetic conversion characteristics, which process will be executed after the output electrode terminals connected to spin valve MR elements are formed in the wafer process and before magnetic head assemblies with the spin valve effect MR elements are mounted in a HDD and actually operated. However, the control operation of magnetic characteristics (pinned direction) of the present invention and an evaluation process of electro-magnetic conversion characteristics (or ρ–H characteristics) may be individually executed. Namely, if necessary, the control of magnetic characteristics may be executed at any time.

Figures 8, 8A:
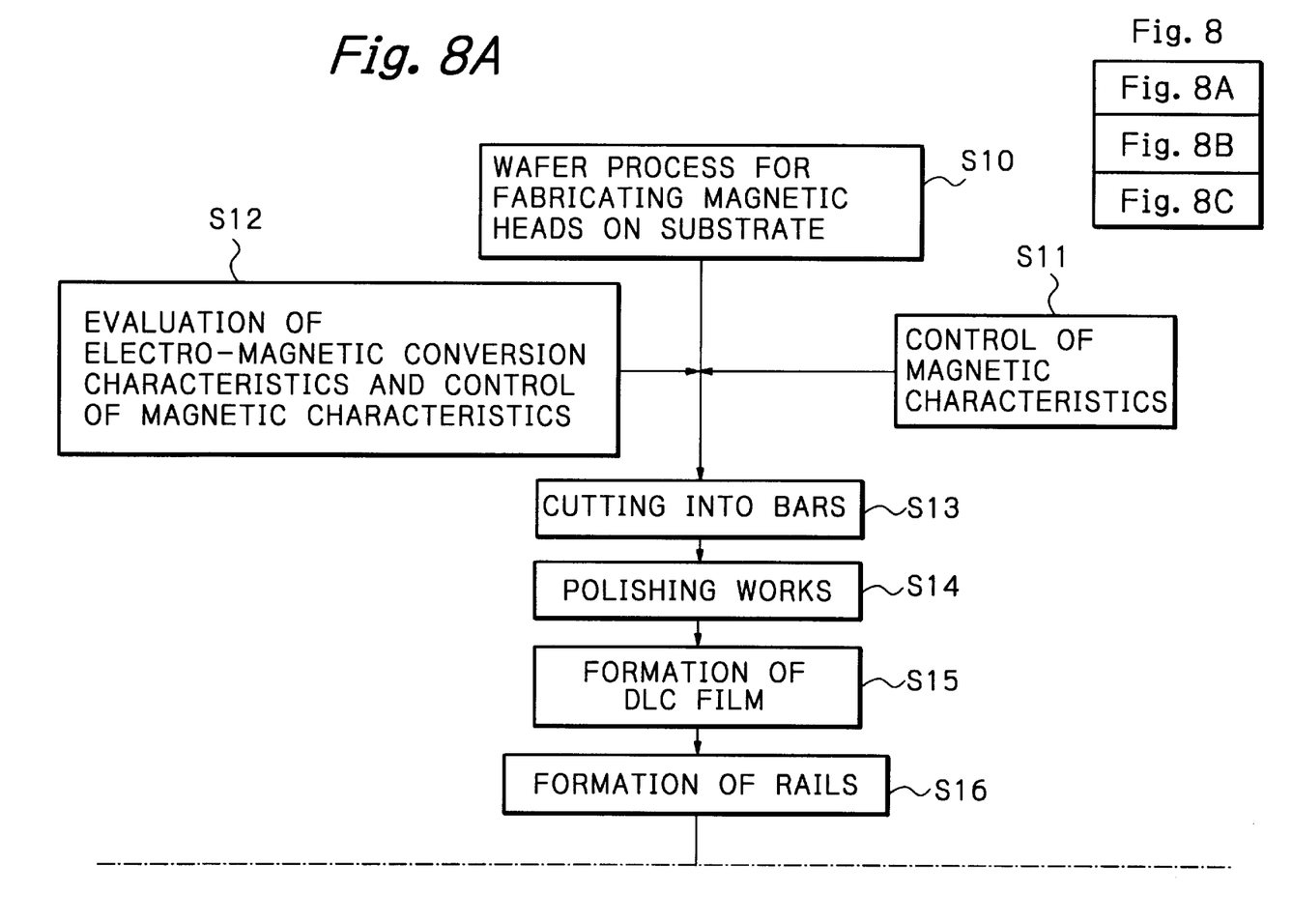
Figure 8B:
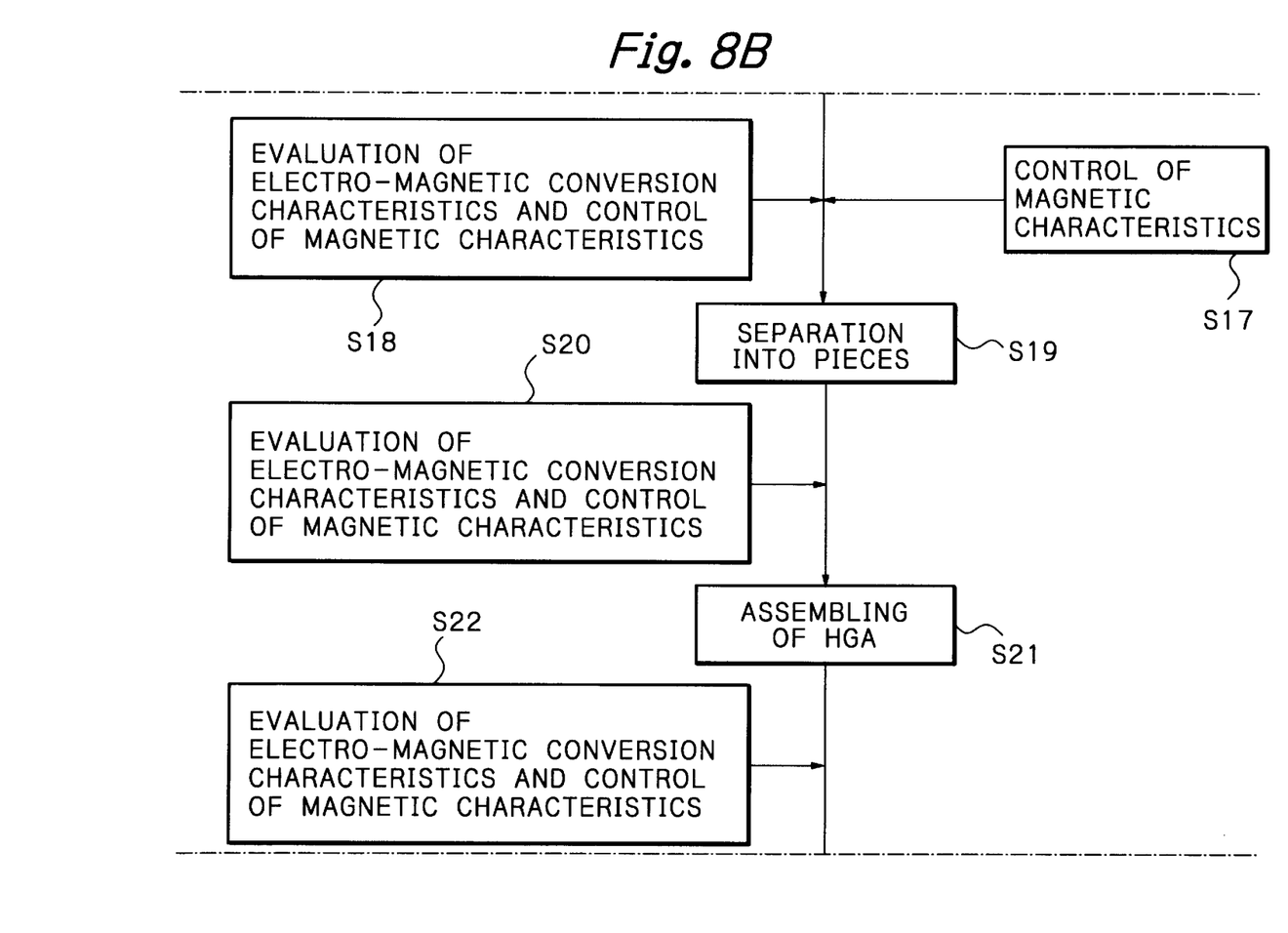
Figure 8C:
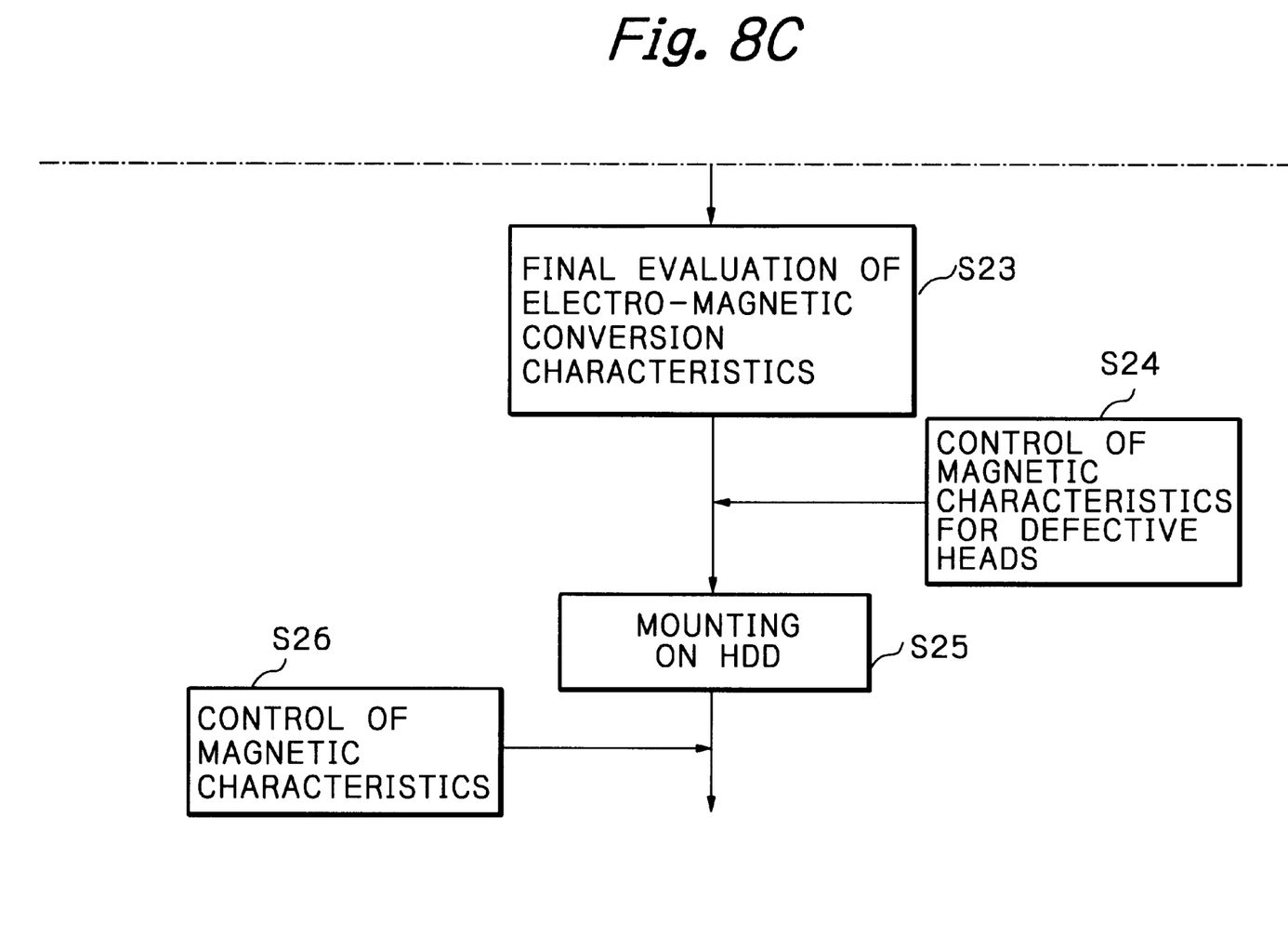

FIG. 8 illustrates timing when the pinned direction control according to the present invention is actually executed. Step 10 in this figure represents a wafer process in which a number of magnetic heads are fabricated on a substrate by an integration technology. After this wafer process has completed, control of the pinned direction according to the present invention is executed at step S11 in place of heat treatment process in magnetic field for controlling magnetic characteristics, which has been conventionally executed. Consequently, the control of the pinned direction can be executed by a very easier process than the conventional heat treatment process. Alternately, if an evaluation process of electro-magnetic conversion characteristics of ρ–H characteristics is executed after the wafer process S10 is completed, control of the pinned direction may be executed during this evaluation process, as shown by step S12. In the evaluation process of electro-magnetic characteristics or ρ–H characteristics, electrode terminals of each magnetic head are electrically connected to the evaluation unit. Accordingly, the control of the pinned direction accomplished by only supplying current to the MR element can be vary easily executed.

Next step S13, step S14, step S15 and step S16 represent a cutting process of the wafer into bars so that a magnetic head is aligned, a polishing processing for adjusting such as a throat height, a film forming process of a DLC (diamond-like carbon) film, and a rail forming process, respectively.

In place of conventional heat treatment in magnetic field process for controlling magnetic characteristics, the control of pinned direction according to the present invention may be executed at step S17 after the rail forming process at step S16. This control of pinned direction may be executed during evaluation process of electro-magnetic conversion characteristics or ρ–H characteristics at step S18. If the control of magnetic characteristics is executed at step S11 or step S12, the control of magnetic characteristics is not executed at steps S17 and S18.

Next step S19 is a cutting process for separating each bar into individual pieces of magnetic head sliders. After the cutting process at step S19, control of pinned direction may be executed during an evaluation process of electro-magnetic characteristics or ρ–H characteristics at step S20. Next step S21 is an assembling process of HGA (Head Gimbal Assembly) in which each of the magnetic head sliders is assembled with a gimbal. After this HGA assembling process at step S21, control of the pinned direction may be executed during an evaluation process of electro-magnetic conversion characteristics or ρ–H characteristics at step S22.

Next step S23 is a final evaluation process of electro-magnetic conversion characteristics or ρ–H characteristics of the magnetic head assembly. If the magnetic head assembly is evaluated as defective one due to variation of the pinned direction in the process at step S23, the control process of pinned direction at step S24 according to the present invention is executed. In the control process at step S24, direct current is supplied so that magnetic field is applied to the MR element in the same direction as inherent pinned direction and the MR element is heated due to the supplied current resulting to recover the inherent pinned direction.

At next step S25, thus produced magnetic head assembly is mounted in HDD. After the mounting process at step S25, control process of the pinned direction at step 26 according to the present invention may be executed, if necessary. Similar to the process at step S24, in this process at step S26, direct current is supplied so that magnetic field is applied to the MR element in the same direction as inherent pinned direction and the MR element is heated due to the supplied current resulting to recover the inherent pinned direction. It should be noted that it is not necessary to execute the pinned direction control at all points described above but it is necessary to execute the pinned direction control at least one point. The later execution of the pinned direction control after the manufacturing process or assembling process, the better probability of maintaining the pinned direction to a correct direction.

Figure 9:
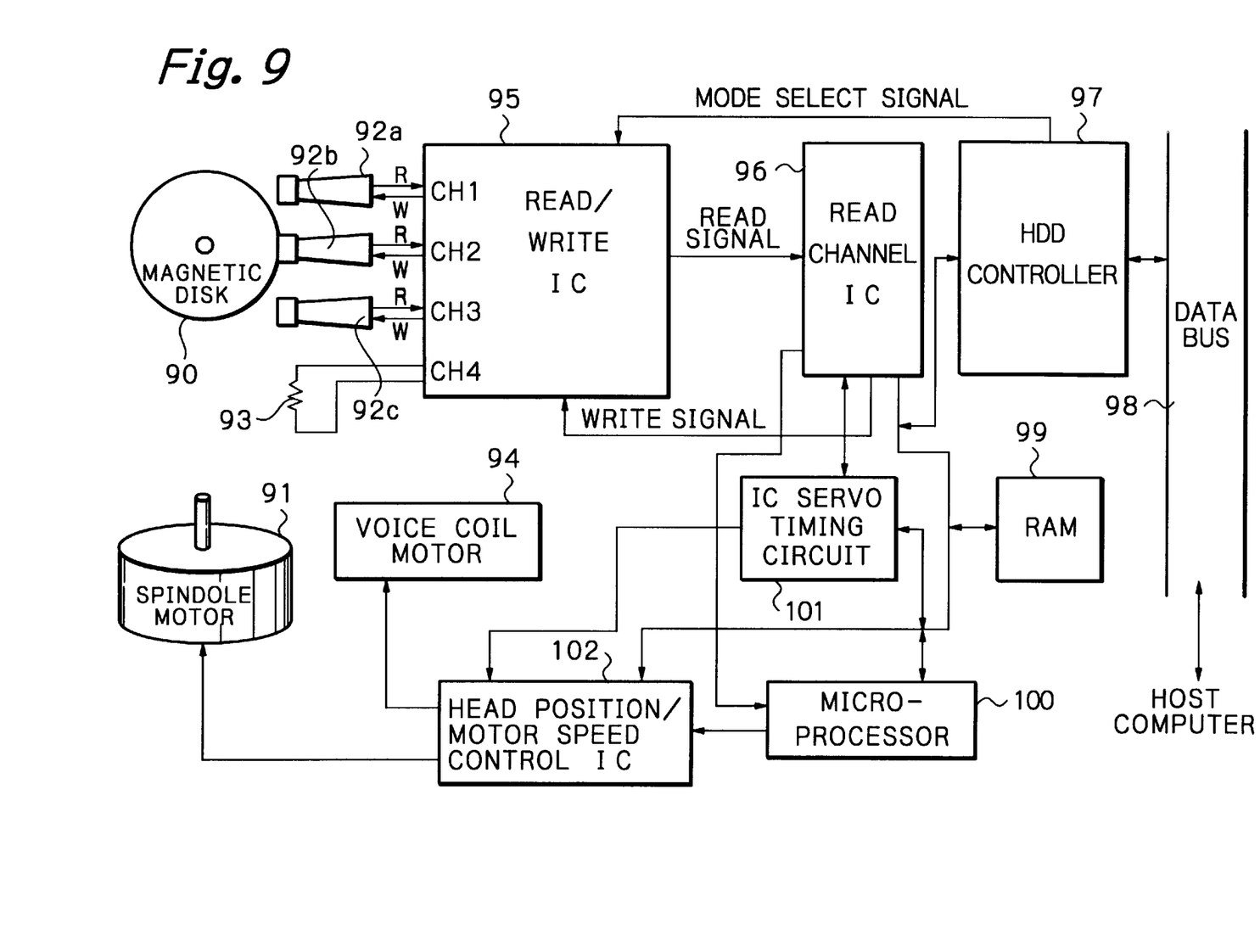
FIG. 9 shows a block diagram schematically illustrating another embodiment according to the present invention.

FIG. 9 schematically illustrates another embodiment of a method of controlling magnetic characteristics of a magnetic head according to the present invention. In this embodiment, the magnetic characteristics (pinned direction) control of a magnetic head assembly is periodically executed during operations of HDD after the assembly is mounted in the HDD. There is a possibility of change in the pinned direction of spin valve effect MR elements due to some damages even during the operations of the HDD in which magnetic head assemblies are mounted causing magnetic characteristics of the MR elements to deteriorate from their inherent conditions. Therefore, in this embodiment, a process of supplying direct current is executed during a self-diagnosis operation at each power-on of the HDD, so that magnetic field is applied to the MR element in the same direction as inherent pinned direction and also the MR element is heated due to the supplied current resulting to recover the inherent pinned direction.

In FIG. 9, reference numeral 90 denotes a magnetic disk and 91 denotes a spindle motor for driving the magnetic disk 90, respectively. Reference numerals 92a, 92b and 92c denote mounted magnetic head assemblies, 93 denotes a dummy resistor for measuring temperature, disposed adjacent to or in contact with the magnetic head 90, and 94 denotes a voice coil motor for driving a driving arm to which these magnetic head assemblies 92a, 92b and 92c and the dummy resistor 93 are attached, respectively. Each of the magnetic head assemblies 92a, 92b and 92c is electrically connected to each channel of a read/write IC 95. The dummy resistor 93 is also electrically connected to one of the channels. The read/write IC 95 supplies direct current (sense current) flowing toward the assist direction to the magnetic head assemblies 92a, 92b and 92c. On the other hand, if the read/write IC 95 supplies sense current flowing toward the against direction, an additional circuit for supplying direct current in the assist direction is needed. If the current flows toward the assist direction, pinning to the correct pinned direction is increased by magnetic field produced by the current. On the other hand, if the current flows toward the against direction, the pinned direction is reversed by the magnetic field produced by the current. It is not necessary that the dummy resistor 93 is connected to one channel of the read/write IC 95 as in this embodiment, and another connection mode can be used to carry out the same operations.

In FIG. 9, furthermore, reference number 96 denotes a lead channel IC, 97 denotes a HDD controller, 98 denotes a data bus, 99 denotes a RAM, 100 denotes a microprocessor, 101 denotes an IC servo timing circuit and 102 denotes a head position/motor speed control IC, respectively. The configuration and operations of this HDD is known except that the dummy resistor 93 is provided, that the direct current toward the assist direction is supplied to the magnetic head assemblies 92a, 92b and 92c, and that the microprocessor 100 has different software.

During a self-diagnosis operation at each power-on of the HDD, the pinned direction control is executed in the same flow of steps as shown in FIG. 5. Namely, first, reference resistance $R_{REF}$ of each of spin valve effect MR elements of the respective magnetic head assemblies 92a, 92b and 92c is measured. This measurement is executed by supplying reference current $I_{REF}$ of 1 mA to each of the MR elements as sense current and by detecting the terminal voltage across the MR element. Then, reference temperature $T_{REF}$ of the MR element is measured. This temperature is measured by supplying the dummy resistor 93 with the reference current $I_{REF}$ of 1 mA and by detecting the terminal voltage across the dummy resistor 93. Then, an increase in temperature $\Delta T$ of each of the MR elements is determined. The increase in temperature $\Delta T$ is difference between the temperature T to which the MR element should be heated and the reference temperature $T_{REF}$. Therefore, if the temperature T to which the MR element is determined to control the pinned direction, the increase in temperature $\Delta T$ can be easily obtained by the measured reference temperature $T_{REF}$. After that, a value $I_{CA}$ of direct current to be supplied to each of the MR elements is calculated from the same equation, i.e., $\Delta T=1.9469\times10^{-4}\times(I_{CA}\times R_{REF})^2+1.0845$ as in the embodiment of FIG. 3. Then, the direct current with the calculated value $I_{CA}$ is supplied to each of the MR elements for a predetermined time period of about 1 sec., and then the MR elements are cooled in the same manner as in the embodiment of FIG. 3. Since reference temperature in a magnetic head is considerably high in the HDD, it is very effective to consider the reference temperature measured while calculating the value $I_{CA}$ of the current to be supplied.

In this embodiment, the pinned direction control is executed only during self-diagnosis at power-on of the HDD. In case that the spin valve effect MR element is supplied with sense current in the assist direction, small amount of current toward the assist direction is always supplied during operation of the HDD and therefore, a possibility of inversion of the pinned direction will become low. Thus, in such configuration, this embodiment is very effective. It is apparent that the similar control of the pinned direction can be executed not only at power-on of the HDD but also during the operation of a HDD or at power-off of the HDD.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of controlling magnetic characteristics of a spin valve effect magnetoresistive element, comprising the steps of:

supplying direct current with a gradually increasing value to the magnetoresistive element so as to generate magnetic field in a desired direction and to generate joule heat, said generated magnetic field and said generated joule heat being applied to said magnetoresistive element; and controlling a magnetization direction caused by exchange coupling in said magnetoresistive element based upon said applied magnetic field and said applied joule heat.

2. The method as claimed in claim 1, wherein said method further includes a step of supplying the direct current with a value to said magnetoresistive element after said supplying step, said value being gradually decreased to a value and being maintained at the value for a period of time so as to cool said magnetoresistive element.

3. The method as claimed in claim 1, wherein said method further includes a step of supplying the direct current with a value to said magnetoresistive element after said supplying step, said value being gradually decreased to zero so as to cool said magnetoresistive element.

4. The method as claimed in claim 1, wherein said magnetoresistive element has sense current terminals, and wherein said direct current is supplied from said sense current terminals to said magnetoresistive element.

5. The method as claimed in claim 1, wherein a time period for supplying the direct current with a gradually increasing value to said magnetoresistive element is a fixed period of time.

6. The method as claimed in claim 1, wherein the value of said direct current supplied is determined depending upon a resistance value of said magnetoresistive element.

7. The method as claimed in claim 2, wherein said method further includes a step of measuring the resistance value ($R_{REF}$) of said magnetoresistive element when a reference current value ($I_{REF}$) is supplied to said magnetoresistive element, and a step of determining the value of said direct current supplied depending upon the measured resistance value ($R_{REF}$).

8. The method as claimed in claim 7, wherein said determining step includes a step of determining the direct current in accordance with a temperature ($T_{REF}$) of said magnetoresistive element when a reference current value ($I_{REF}$) is supplied thereto, a temperature (T) up to which said magnetoresistive element is to be heated, and said measured resistance value ($R_{REF}$).

9. The method as claimed in claim 8, wherein said determining step includes a step of calculating the value of the direct current ($I_{CA}$) from an experimental equation of $\Delta T=1.9469\times10^{-4}\times(I_{CA}\times R_{REF})^2+1.0845$, where $\Delta T$ is the difference between the temperature $T_{REF}$ and the temperature T.

10. A method of controlling magnetic characteristics of a magnetic head with a spin valve effect magnetoresistive element, the magnetic characteristics of said magnetic head being controlled in accordance with the method as claimed in claim 1.

11. The method as claimed in claim 1, wherein said magnetic characteristics control is executed at least one time during manufacturing processes of said magnetic head and/ or during evaluation processes of electro-magnetic conversion characteristics of said magnetic head.

12. The method as claimed in claim 10, wherein said magnetic head is to be mounted in a magnetic disk device, and wherein said magnetic characteristics control is executed at least one time during assembling processes of said magnetic disk device after manufacturing processes of said magnetic head and/or during evaluation processes of electro-magnetic conversion characteristics of said magnetic disk device.

13. The method as claimed in claim 10, wherein the magnetic characteristics control is executed at least one time during a self-diagnosis carried out at power-on of said magnetic disk device.

14. A method of controlling magnetic characteristics of a spin valve effect magnetoresistive element, including a non-magnetic metallic material thin-film layer, first and second ferromagnetic material thin-film layers magnetically separated with each other by said non-magnetic material thin film layer and an antiferromagnetic material thin-film layer deposited on said second ferromagnetic layer, said method comprising the steps of:

supplying direct current with a gradually increasing value to said magnetoresistive element so as to generate a magnetic field in a desired direction and to generate joule heat;

applying said generated joule heat to heat said antiferromagnetic layer to increase its temperature equal to or more than the Neel temperature;

applying said generated magnetic field to said second ferromagnetic layer to magnetize it toward a predetermined direction; and applying said generated magnetic field to said antiferromagnetic layer.

15. The method as claimed in claim 14, wherein said method further includes a step of supplying the direct current with a value to said magnetoresistive element after said supplying step, said value being gradually decreased to a value and being maintained at the value for a period of time so as to cool said magnetoresistive element.

16. The method as claimed in claim 14, wherein said method further includes a step of supplying the direct current with a value to said magnetoresistive element after said supplying step, said value being gradually decreased to zero so as to cool said magnetoresistive element.

17. The method as claimed in claim 14, wherein said magnetoresistive element has sense current terminals, and wherein said direct current is supplied from said sense current terminals to said magnetoresistive element.

18. The method as claimed in claim 14, wherein a time period for supplying the direct current with a gradually increasing value to said magnetoresistive element is a fixed period of time.

19. The method as claimed in claim 14, wherein the value of said direct current supplied is determined depending upon a resistance value of said magnetoresistive element.

20. The method as claimed in claim 19, wherein said method further includes a step of measuring the resistance value ($R_{REF}$) of said magnetoresistive element when a reference current value ($I_{REF}$) is supplied to said magnetoresistive element, and a step of determining the value of said direct current supplied depending upon the measured resistance value ($R_{REF}$).

21. The method as claimed in claim 20, wherein said determining step includes a step of determining the direct current in accordance with a temperature ($T_{REF}$) of said magnetoresistive element when a reference current value ($I_{REF}$) is supplied thereto, a temperature (T) up to which said magnetoresistive element is to be heated, and said measured resistance value ($R_{REF}$).

22. The method as claimed in claim 21, wherein said determining step includes a step of calculating the value of the direct current ($I_{CA}$) from an experimental equation of $\Delta T=1.9469\times10^{-4}\times(I_{CA}\times R_{REF})^2+1.0845$, where $\Delta T$ is the difference between the temperature $T_{REF}$ and the temperature T.

23. A method of controlling magnetic characteristics of a magnetic head with a spin valve effect magnetoresistive element, the magnetic characteristics of said magnetic head being controlled in accordance with the method as claimed in claim 14.

24. The method as claimed in claim 23, wherein said magnetic characteristics control is executed at least one time during manufacturing processes of said magnetic head and/or during evaluation processes of electro-magnetic conversion characteristics of said magnetic head.

25. The method as claimed in claim 23, wherein said magnetic head is to be mounted in a magnetic disk device, and wherein said magnetic characteristics control is executed at least one time during assembling processes of said magnetic disk device after manufacturing processes of said magnetic head and/or during evaluation processes of electro-magnetic conversion characteristics of said magnetic disk device.

26. The method as claimed in claim 23, wherein the magnetic characteristics control is executed at least one time during a self-diagnosis carried out at power-on of said magnetic disk device.

* * * * *